2,710,876
N-SUBSTITUTED GLYCINE ESTERS OF GLUCONIC ACID

Ernst T. Krebs and Ernst T. Krebs, Jr., San Francisco, Calif.

No Drawing. Application December 9, 1953, Serial No. 397,254

12 Claims. (Cl. 260—482)

This invention relates to the synthesis of certain organic compounds which are characterized by the presence of one or more labile methyl groups and which are capable of donating such labile methyl group or groups in the physiological process of transmethylation.

As is well-known, certain amino acids are an essential ingredient of the diet of mammals, or must be synthesized from other amino acids if they are absent from the diet. For example, methionine is known to be essential for the growth of rats. It is also known that mammals are unable to synthesize the methyl group which forms a part of the structure of certain amino acids, such as methionine. Work by Du Vigneaud has shown that, when methionine is replaced by homocysteine in the diet of rats, choline is indispensable. This indicates that choline is a methyl donor and converts homocysteine to methionine. Further work employing deuterium on the methyl group of methionine has conclusively shown that this methyl group is donated by methionine to produce choline and creatine.

It is an object of the present invention to provide synthetic organic compounds having labile methyl groups.

Yet another object of the present invention is to provide methods of synthesizing such compounds.

A still further object is to provide synthetic compounds which are capable of serving as intermediates in the synthesis of compounds having labile methyl groups.

A particular object is to provide synthetic compounds, and methods of an intermediates for synthesis of such compounds, which are more effective methyl donors than known methyl donors such as methionine and choline.

These and other objects of the invention will be apparent from the ensuing description and the appended claims.

The compounds of the present invention are substituted glycones of the type represented by the formula AG wherein A represents the aglycone portion and G represents the glycone portion of the molecule. In such compounds G is preferably d-gluconic acid (or its equivalent lactone) but may be other glycones such as l-gluconic acid, a racemic mixture of the d- and l-gluconic acids, glucuronic acid, glucosaminic acid, d-glucosamine, l-glucosamine, d-glucose, l-glucose, other hexoses and hexose derivatives, pentoses and pentose derivatives and other simple carbohydrates and carbohydrate derivatives.

The aglycone A may be any substituent capable of acting as a methyl donor. Preferably, however, it is an N-substituted glycine radical in which the N-substituent consists of or contains a labile methyl group. The aglycone A may, however, be any of a number of other methyl donor radicals. For example, other amino acids may be substituted for glycine, e. g., alanine, serine, cysteine and α-amino butyric acid in which the amino nitrogen is attached to a methyl or methyl donor substituent. Also, amino alcohol radicals may replace the preferred glycine radical, e. g., methanolamine, ethanolamine and propanolamine in which the amino nitrogen is similarly substituted by a methyl or other methyl donor group. Also, A may represent choline or N-isopropyl homologues of choline.

Compounds of the present invention are preferably glycine derivatives of d-gluconic acid in which the glycine radical, —NH$_2$.CH$_2$.CO—, is attached to the gluconic acid by an oxy linkage derived from one of the alcoholic hydroxyl groups of the gluconic acid; in which at least one of the hydrogens of the amino (NH$_2$) group is substituted by a methyl radical or by another methyl donor radical; and in which methylene (CH$_2$) group may be substituted by similar methyl donor groups. Preferred compounds of the invention can be characterized by the following formula

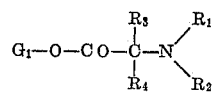

in which G$_1$ represents the d-gluconic acid portion of the molecule; R$_1$ and R$_2$ are methyl or other methyl donor groups; R$_3$ and R$_4$ may be hydrogen, alkyl groups or groups of the type —NR$_1$R$_2$; and the oxy linkage between gluconic acid and glycine portions of the molecule is attached to a carbinol rather than a carboxy carbon of the gluconic acid portion of the molecule. Also the nitrogen of the NR$_1$R$_2$ group may be substituted by a third methyl group or methyl donor group. Preferably R$_1$ and R$_2$ are methyl or isopropyl groups.

The following specific examples will serve to illustrate the invention, including the end products produced in accordance therewith, intermediates employed and methods of synthesis.

*Example 1.—Preparation of N-dimethylamino acetate of gluconic acid from chloracetyl chloride, gluconic acid and dimethylamine*

178.2 grams of d-gluconolactone and 118.7 grams of monochloracetyl chloride were placed in a 500 ml. Erlenmeyer flask and heated on a hot water bath at 85° C. Within four hours the lacton dissolved in and reacted with the chloracetyl chloride. The reaction was (1)
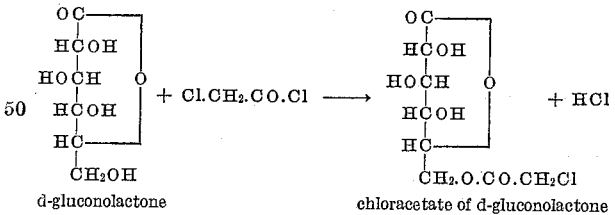

As is known [cf. Mitchell, "A Textbook of Biochemistry," 2d ed. pp. 16–17], d-gluconic acid, like other similar sugar acids, dehydrates readily to form the lactone in which the oxygen-containing ring may be a pyranose-like (six-membered) ring as given above, or a furanose-like (five-membered) ring in which the oxygen is attached to the terminal carbonyl carbon and to the third or gamma carbinol carbon. For purposes of the present invention, these forms are equivalent. For convenience, reference will be made hereinafter merely to "gluconolactone," or d-gluconolactone, by which is meant (unless otherwise stated) the pyranose type of structure illustrated above.

The syrupy product of reaction was washed with three ether washes to remove unreacted chloracetyl chloride and HCl. A yield of 150 grams of chloracetate of d-gluconolactone was obtained, and was dissolved in 250 ml. of distilled water and warmed on a hot water bath at 60° C. to hydrolyze the lactone to the acid; i. e., to break the lactone ring and form the corresponding gluconic acid:

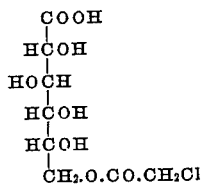

Chloracetate of d-gluconic acid

The solution was then cooled to 3° C. in an ice bath and 53.1 gms. of dimethylamine were added slowly with continuous stirring. The solution was then allowed to stand at room temperature for one hour with occasional stirring and was then warmed in a hot water bath under reflux at 60° C. for three hours. The reaction involved was (2)

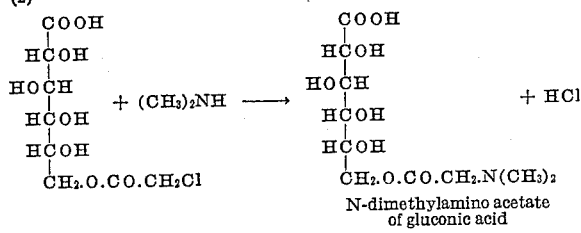

The resulting aqueous solution was then dialyzed in a cellophane bag until free of chloride ion as shown by silver nitrate test. In this manner, HCl, dimethylamine, gluconolactone and dimethylamine hydrochloride were removed. About 7–8 hours were required.

Sodium hydroxide was added to the dialysate (i. e., the solution which had not passed through the membrane), to bring the pH to 7.5, the reaction being as follows:

(3)

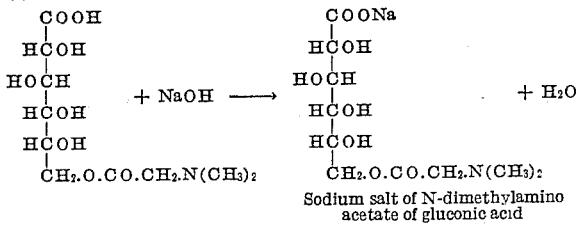

The aqueous solution of this salt was shell frozen in bottles and lyophilized by known techniques to produce an over-all yield of 55.8%. The salt is tasteless, white, hygroscopic and crystalline; it melts at 186° C.; and it is insoluble in ether, chloroform, acetone and benzene. From it, or from the free acid, may be prepared the calcium and other salts, esters, etc.

*Example II.—Other methods of preparation of N-dimethylamino acetate of gluconic acid*

(a) *From N-dimethylglycine and d-gluconic acid.*—N-dimethylamino acetic acid (N-dimethylglycine), a golden-yellow, viscous liquid which becomes jelly-like on standing, can be prepared by the reaction of 2 mols of anhydrous dimethylamine with one mol of chloracetic acid at −5° C., then at room temperature, then at 60–80° C. under reflux. 103 grams of N-dimethylglycine were poured into a round bottom flask and to it were added 196 grms. of gluconic acid in 50% aqueous solution. The mixture was heated at 35–40° C. and stirred continuously for two weeks. The reaction was as follows:

(4)

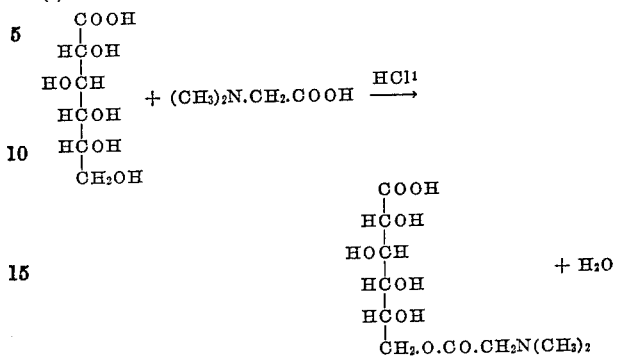

[1] HCl gas used as a catalyst.

The solution was dialyzed for 7–8 hours until free from chloride. Then sodium hydroxide was added to bring the pH to 7.5. The solution was shell frozen and lyophilized. The yield was about 25%.

(b) *From chloracetic acid and d-gluconolactone.*—Chloracetic acid (141.8 grms.) and d-gluconolactone (178.2 grms.) were reacted on a hot water bath at 85° C. for eight hours. The water liberated by condensation of the carboxyl group of the chloracetic acid with gluconolactone hydrolyzed the latter to gluconic acid. The reaction was as follows:

(5)

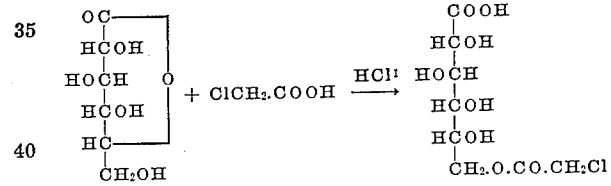

The resulting chloracetate of d-gluconolactone was dissolved in water and reacted with dimethylamine in accordance with reaction (2) supra, as described in Example I.

*Example III.—Preparation of N-di-isopropylamino acetate of gluconic acid*

94.5 grams of chloracetic acid and 178.1 grams of d-gluconolactone powder were placed in a 250 ml. Erlenmeyer flask fitted with a calcium chloride tube. The flask was heated on a boiling water bath. The chloracetic acid crystals commenced melting at 61° C. After five hours of heating the gluconolactone dissolved. Then dry HCl gas was bubbled into the syrupy solution until HCl fumes came off. The HCl acted as a catalyst for the following reaction:

(5a)

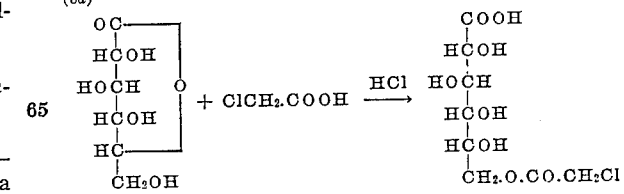

The syrupy solution was heated on the water bath for an additional 30 hours and was then dissolved in 150 ml. water and poured into a flask fitted with a mechanical stirrer, a reflux condenser and a separatory funnel. The flask was cooled in an ice bath and 202.4 grams of di-isopropylamine were added slowly from the separatory funnel during one hour. The reaction occurring was as follows:

(6)

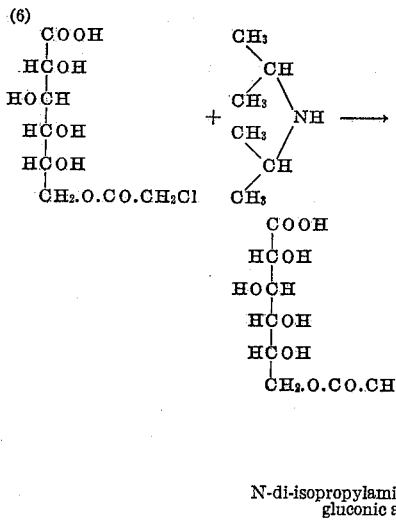

N-di-isopropylamino acetate of gluconic acid

The solution was distilled under reduced pressure (33 mm. of Hg) in a 50° C. water bath to remove excess amine, water and HCl, until a thick syrup developed, which was dissolved in 500 ml. of water. The solution was neutralized with aqueous NaOH solution, shell frozen in bottles and lyophilized. The dry, lyophilized material was dissolved in 500 ml. of Shellacol SDA No. 1. (Shellacol is a trade-mark of Commercial Solvents Corp. for a solution of 2% denatured methyl alcohol, 1% ethyl acetate and 1% aviation gasoline in ethyl alcohol.) The Shellacol acted as a selective solvent for impurities (sodium chloracetate, sodium di-isopropylamino acetate, sodium gluconate and di-isopropylamine hydrochloride. Other solvents such as high proof ethyl alcohol can be used for the same purpose. From time to time, over a period of twelve hours, the mixture was stirred. The residue of sparingly soluble sodium salt of N-di-isopropylamino acetate of gluconic acid, was suction filtered and washed twice with 200 ml. of anhydrous Shellacol. The final product was a brownish white powder melting with decomposition at 176–178° C. The corresponding free acid (reaction product of equation (6)) decomposes at 180° C.

Alternative methods of synthesis are those corresponding to reactions (1), (2) and (4) above, in which, however, di-isopropylamine and N-di-isopropyl glycine are substituted for dimethylamine and N-dimethyl glycine, respectively.

*Example IV.—Preparation of di-(N-di-isopropylamino) acetate of gluconic acid*

129 grams of dichloracetic acid were placed in an Erlenmeyer flask and 178 grams of d-gluconolactone powder were added. A calcium tube was attached and the flask was heated in a boiling water bath. After five to six hours of heating, the gluconolactone dissolved in the dichloracetic acid. Dry HCl gas was bubbled into the syrupy solution until HCl fumes came off. The function of the HCl was to catalyze the desired reaction. The solution was heated in the boiling water bath for 30 hours longer. The reaction was as follows:

(7)

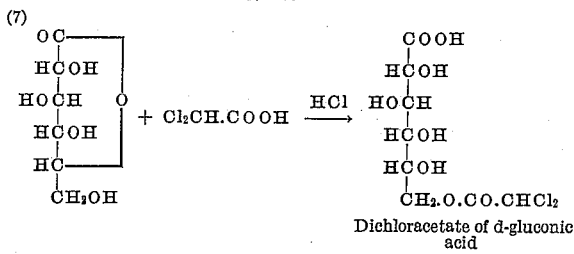

Dichloracetate of d-gluconic acid

The resulting syrupy solution was dissolved in 150 ml. of water and placed in a flask fitted with a reflux condenser, a mechanical stirrer and a separatory funnel. 405 grams of di-isopropylamine were added slowly through the separatory funnel while the contents of the flask were stirred. The flask was cooled in an ice bath during addition of the amine, which required about 1½ hours. After addition of the amine, the contents of the flask were stirred an additional hour. Excess amine and HCl were distilled off at reduced pressure (30 mm. Hg) in a 50° C. water bath. Distillation was stopped when a syrupy liquid was formed.

The reaction of the dichloracetate of gluconic acid and the di-isopropylamine was as follows:

(8)

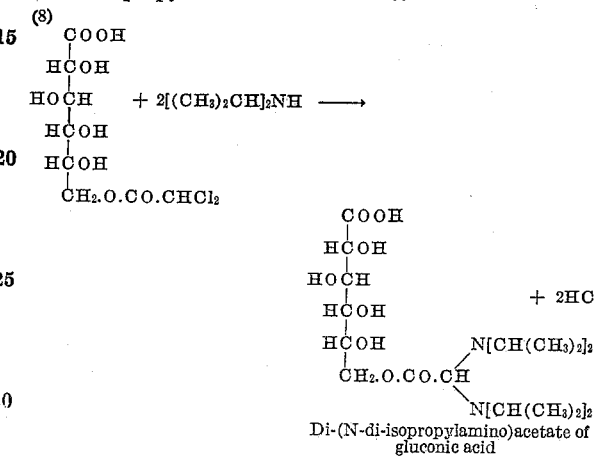

Di-(N-di-isopropylamino)acetate of gluconic acid

The syrupy liquid was dissolved in 600 ml. of water and the solution was neutralized with aqueous NaOH solution. The neutralized solution was shell frozen in 100 ml. lots in bottles and was lyophilized. To the resulting dry, lyophilized material was added 500 ml. of anhydrous Shellacol and the mixture was stirred occasionally for twelve hours to dissolve out impurities from the sparingly soluble sodium salt of di-(N-di-isopropylamino) acetate of d-gluconic acid. These impurities were sodium di-chloracetate, sodium di-(N-di-isopropylamino) acetate, di-isopropylamine hydrochloride and sodium gluconate. The residue was suction filtered and washed twice with 200 ml. of anhydrous Shellacol. The final product (the sodium salt of di-(N-di-isopropylamino) acetate of d-gluconic acid) was a yellowish-white powder melting with decomposition at 187–189° C.

Other methods of synthesis are those corresponding to reactions (1), (2) and (4) above in which, however dichloracetyl chloride is substituted for chloracetyl chloride, di-isopropylamine is substituted for dimethylamine and N-di-isopropylglycine is substituted for N-dimethyl glycine.

*Example V.—Preparation of tri-(N-di-isopropylamino) acetate of gluconic acid*

81.7 grams of trichloracetic acid and 89 grams of d-gluconolactone powder were added to a 250 ml. Erlenmeyer flask fitted with a calcium chloride tube. The flask was heated in a boiling water bath. The trichloracetic acid commenced melting at 58° C. and, after five hours of heating, the gluconolactone dissolved. Dry HCl gas was bubbled through into the syrupy solution until HCl fumes came off. The HCl functioned as a catalyst. The solution was heated on the water bath for thirty hours longer. The reaction was as follows:

(9)

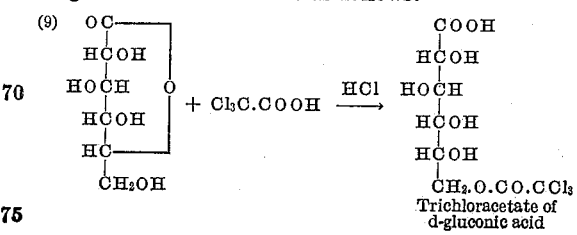

Trichloracetate of d-gluconic acid

The syrupy solution was dissolved in 75 ml. of water and placed in a flask fitted with a reflux condenser, a mechanical stirrer and a separatory funnel. The flask was cooled in an ice bath and 304 grams of di-isopropylamine were added slowly from the separatory funnel over a period of one hour. The reaction was as follows:

(10)

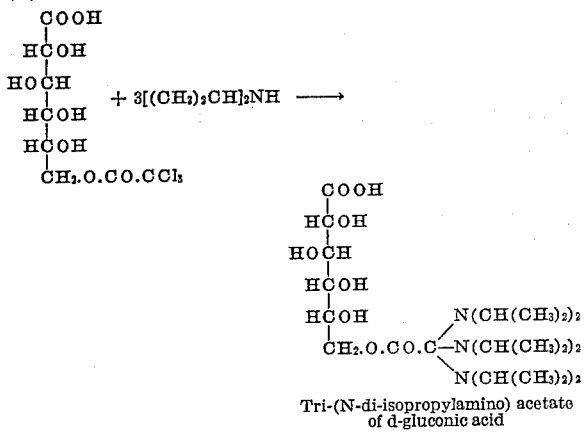

Tri-(N-di-isopropylamino) acetate of d-gluconic acid

Excess amine, water and HCl were then distilled under reduced pressure (30 mm. of Hg) at 50° C. Distillation was stopped when a syrupy liquid was formed, which was dissolved in 300 ml. of water. The solution was neutralized with aqueous NaOH solution and was then shell frozen in bottles and lyophilized. The dry lyophilized material was then purified by means of Shellacol as in Example IV above. The final product (the sodium salt of tri-(N-di-isopropylamino) acetate of d-gluconic acid) was a white powder melting at 121–125° C.

Other methods of synthesis correspond to reactions (1), (2) and (4) above, with appropriate substitution of reagents.

Other methyl donor compounds similar in character to those described in the specific examples above include the N-tri-methyl and the N-tri-isopropyl compounds such as

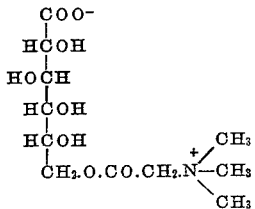

and the corresponding isopropyl homologue in which isopropyl radicals are substituted for the N-methyl radicals. Also, more than one tri-alkyl amino group may be attached to the α carbon of the acetic acid radical.

This application is a continuation-in-part of our co-pending applications Serial No. 257,990, entitled "Therapeutic Preparation," filed November 23, 1951 and Serial No. 213,482, entitled, "Therapeutic Preparation," filed March 1, 1951, and now abandoned.

Several of the intermediates in the preparation described above are novel compounds. The formulae and methods of preparation of these novel intermediates are described in the above examples. Among these intermediates are the following: Chloracetate of d-gluconolactone (reaction (1), above); chloracetate of d-gluconic acid (Example I, above), which is a highly hygroscopic, sugary solid which absorbs moisture from the air to become a syrupy liquid; and dichloracetate of d-gluconic acid (Example IV) and trichloracetate of d-gluconic acid (Example V), both of which are highly hygroscopic materials which absorb moisture from the air to become syrupy liquids. The trichloracetate of d-gluconic acid is highly irritating to the skin and is highly (and exothermically) reactive with amines.

The end products of the invention, i. e., compounds of the type AG in which A and G are as defined above, are methyl donors capable of donating methyl groups in transmethylation processes. Thus, when rats or mice are deprived of dietary methyl groups such as provided by methionine, betaine, choline, etc., the animals develop necrosis of the renal cortex. Such dietary deficiency, and the resulting necrosis of the renal cortex, are corrected when compounds of the present invention, of the type AG, are added to the diet of such animals. For example, if rats or mice are supplied with a diet which is lacking in methionine but which contains homocysteine, necrosis of the renal cortex results. But when the same methionine-free diet is supplemented by, for example, the sodium or calcium salts of N-dimethylamino acetate (or N-di-isopropylamino acetate) of d-gluconic acid, the diet is corrected and the necrotic condition is alleviated or disappears. The N-dimethyl or N-di-isopropyl group supplies the methyl group necessary to convert homocysteine to methionine.

Another useful property of the compounds of the invention such as the N-dimethylamino and N-di-isopropylamino acetates of d-gluconic acid (and their salts), resides in their ability to stimulate seed germination. Thus the germination of orchid seeds and sweet peas has been stimulated by admixture of these compounds.

For the above and other purposes, the N-isopropyl compounds are preferred, e. g., the salts of N-di-isopropylamino acetate of d-gluconic acid, the salts of di(N-di-isopropylamino) acetate of d-gluconic acid and the salts of tri(N-di-isopropylamino) acetate of d-gluconic acid. These N-isopropyl compounds are more potent methyl donors than the N-methyl compounds.

These compounds may be used in the pure state but are preferably used in diluted form. They may be used in the form of the free acid, the lactone or salts or even esters and other carboxy derivatives, such as the methyl and ethyl esters. When used as dietary supplements for animals they are preferably used in the form of sodium or calcium salts, but for stimulating seed growth other salts such as potassium salts may be used.

Diluents may be liquid or solid, e. g., water, physiologic salt solution, elixir or syrup, magnesium oxide, arrowroot starch, lactose, etc. The concentration of active compound may vary widely, e. g., 1% to 90%, preferably not more than 50%.

It will, therefore, be apparent certain novel compounds have been provided which are effective methyl donors in the process of transmethylation and which are useful, inter alia, as dietary supplements and as seed germination stimulants. Novel methods of preparation have also been provided, as well as novel intermediates useful in the preparation of the end products.

We claim:
1. Compounds of the type

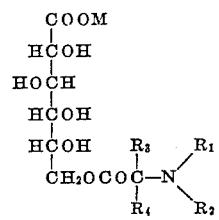

wherein $R_1$ and $R_2$ are selected from the group consisting of methyl and isopropyl radicals, $R_3$ and $R_4$ are selected from the group consisting of hyrogen, alkyl groups and radicals of the type

and M is selected from the group consisting of hydrogen and salt-forming radicals.

2. Compounds of the type

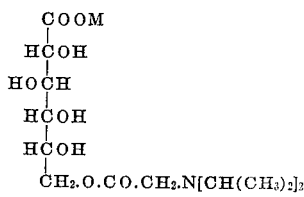

wherein M is selected from the group consisting of hydrogen and the hydrogen equivalent of a salt-forming metal.

3. Compounds of the type

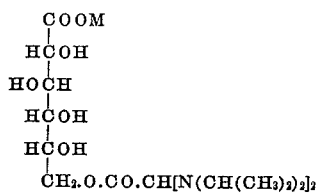

wherein M is selected from the group consisting of hydrogen and the hydrogen equivalent of a salt-forming metal.

4. Compounds of the type

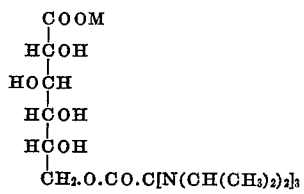

wherein M is a selected from the group consisting of hydrogen and the hydrogen equivalent of a salt-forming metal.

5. The sodium salt of the N-di-isopropylamino acetate of d-gluconic acid.

6. The sodium salt of the di(N-di-isopropylamino) acetate of gluconic acid.

7. The sodium salt of the tri(N-di-isopropylamino) acetate of gluconic acid.

8. A method of preparing the sodium salt of the N-di-isopropylamino acetate of d-gluconic acid which comprises condensing chloracetic acid with d-gluconolactone to yield the corresponding chloracetate in which the carboxyl group of the chloracetic acid esterifies an hydroxyl of the gluconolactone, then condensing di-isoproplyamine with said chloracetate in equi-molar proportions to yield the corresponding N-di-isopropyl derivative, then neutralizing the acid with NaOH and recovering the desired sodium salt.

9. A method of preparing the sodium salt of the di-(N-di-isopropylamino) acetate of d-gluconic acid which comprises condensing dichloracetic acid with d-gluconolactone to yield the corresponding dichloracetate in which the carboxyl group of the dichloracetic acid esterifies an hydroxyl of the gluconolactone; then condensing di-isopropylamine with said dichloracetate in the proportions of two moles of amine to one of the acetate to yield the corresponding di-(N-di-isopropylamino) acetate; then neutralizing the acid with NaOH and recovering the desired sodium salt.

10. A method of preparing the sodium salt of the tri-(N-di-isopropylamino) acetate of d-gluconic acid which comprises condensing trichloracetic acid with d-gluconolactone to yield the corresponding trichloracetate in which the carboxyl group of the trichloracetic acid esterifies an hydroxyl of the gluconolactone; then condensing di-isopropylamine with said trichloracetate in the proportions of three mols of the amine to one of the acetate to yield the corresponding tri(N-di-isopropylamino) acatate; then neutralizing the acid with NaOH and recovering the desired sodium salt.

11. Compounds of the type

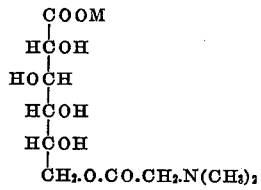

wherein M is selected from the group consisting of hydrogen and the hydrogen equivalent of a salt-forming metal.

12. Compounds of the type

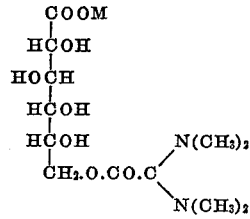

wherein M is selected from the group consisting of hydrogen and the hydrogen equivalent of a salt-forming metal.

References Cited in the file of this patent

UNITED STATES PATENTS

| | | |
|---|---|---|
| 2,293,034 | Moore | Aug. 18, 1942 |
| 2,460,191 | Phillips | Jan. 25, 1949 |

OTHER REFERENCES

Du Vigneaud et al.: J. Biol. Chem. (1946) 165, 639–48.
Wolfrom et al.: J. Am. Chem. Soc. (1947) 69, 2411–3.
Bowman et al.: J. Chem. Soc. (1950) 1346–9.
Kiyoshi Ashida et al.: C. A. (1951) 45, 562.